United States Patent [19]
Golden

[11] Patent Number: 5,826,616
[45] Date of Patent: Oct. 27, 1998

[54] VALVE SPOOL POSITION DETECTOR APPARATUS

[75] Inventor: Michael J. Golden, Sterling Heights, Mich.

[73] Assignee: ISI Norgren, Inc., Anoka, Minn.

[21] Appl. No.: 752,045

[22] Filed: Nov. 19, 1996

[51] Int. Cl.[6] .................................................. E03B 7/07
[52] U.S. Cl. .................... 137/554; 251/351; 137/557; 346/686
[58] Field of Search ................ 137/554, 487.5, 137/557; 251/351; 340/686

[56] References Cited

U.S. PATENT DOCUMENTS

| | | | |
|---|---|---|---|
| 3,347,259 | 10/1967 | Lansky et al. | 137/269 |
| 4,075,928 | 2/1978 | Bitonti | 91/29 |
| 4,227,547 | 10/1980 | Cameron | 137/554 |
| 4,257,455 | 3/1981 | Cameron | 137/596.16 |
| 4,269,225 | 5/1981 | Ruchser et al. | 137/596.16 |
| 4,299,251 | 11/1981 | Dugas . | |
| 4,345,620 | 8/1982 | Ruchser et al. | 137/596.16 |
| 4,585,029 | 4/1986 | Harding . | |
| 4,590,963 | 5/1986 | Gardner et al. . | |
| 4,596,980 | 6/1986 | Bergeron et al. . | |
| 4,656,400 | 4/1987 | Pailthorp et al. . | |
| 4,659,969 | 4/1987 | Stupak, Jr. . | |
| 4,665,348 | 5/1987 | Stupak, Jr. . | |
| 4,953,590 | 9/1990 | Kakinuma et al. . | |
| 4,970,941 | 11/1990 | Reinhardt | 91/433 |
| 4,993,684 | 2/1991 | Prina | 251/367 |
| 5,004,014 | 4/1991 | Bender | 137/487.5 |
| 5,086,273 | 2/1992 | Leon . | |
| 5,101,856 | 4/1992 | Kakinuma et al. . | |
| 5,231,469 | 7/1993 | Jeffers et al. | 356/373 |
| 5,236,012 | 8/1993 | Lin . | |
| 5,244,002 | 9/1993 | Frederick . | |
| 5,257,014 | 10/1993 | Zimmermann . | |
| 5,320,123 | 6/1994 | Corso et al. | 137/554 |
| 5,331,152 | 7/1994 | Fenton | 250/227 |
| 5,484,352 | 1/1996 | Kuma . | |
| 5,502,380 | 3/1996 | Sittler et al. | 324/207 |
| 5,538,037 | 7/1996 | Pizao | 137/554 |

FOREIGN PATENT DOCUMENTS

| | | |
|---|---|---|
| 60-109679 | 6/1985 | Japan . |
| 2062124 | 5/1981 | United Kingdom . |
| 2078951 | 1/1982 | United Kingdom . |
| 2149942 | 12/1985 | United Kingdom . |

OTHER PUBLICATIONS

European Search Report dated Feb. 9, 1998.

*Primary Examiner*—Denise L. Ferensic
*Assistant Examiner*—John Ball
*Attorney, Agent, or Firm*—Young & Basile, P.C.

[57] ABSTRACT

A shiftable valve spool has a plurality of distinct targets carried thereon. The targets are preferably axially spaced and located at one end of the valve spool. A detector mounted in the valve detects each target as each target enters a detection field of the detector. The detector generates a distinct output indicative of one target positioned within the detection field of the detector. A control determines, in response to the output from the detector, the exact valve spool position.

20 Claims, 3 Drawing Sheets

FIG·2

VALVE SPOOL POSITION DETECTOR APPARATUS

BACKGROUND OF THE INVENTION

1. Field of the Invention:

The present invention relates, in general, to directional fluid control valves and, more specifically, to apparatus for sensing the position of a shiftable valve spool in fluid control valves.

2. Description of the Art:

Electromagnetic directional control valves typically use a solenoid which, when energized by the application of electrical power, causes linear advance of a core. The core may be directly coupled to a spool in a valve body to shift the spool between positions to open and close various fluid flow passages extending through the valve body. Alternately, the solenoid may indirectly shift a spool by applying pressurized air to a pilot valve having an extendable piston coupled to the valve spool.

It is often necessary in a control operation to determine if a particular valve spool has shifted position or to determine that devices connected to and controlled by the valve, such as fluid cylinders, etc., have shifted position upon energization of the valve.

Various sensors have been employed to detect the position of a valve spool. Hall effect sensors, limit switches, etc., have been employed to detect movement of the spool to one end position in a valve. A Hall effect sensor has been mounted in the valve housing adjacent to a pair of oppositely polarized magnets which are carried on the valve spool to detect the position of the spool.

Despite these efforts to determine valve spool position, it is still desirable to provide an apparatus for accurately determining the position of a valve spool in a valve. It would also be desirable to provide an apparatus which substantially instantaneously detects the position of a shiftable valve spool to enable corrective or evasive action to be immediately initiated in the event of an incomplete spool shift.

SUMMARY OF THE INVENTION

The present invention is a valve spool position sensing apparatus suitable for use in a fluid-operated valve. The spool is disposed in the valve body and is axially movable between at least two positions for switching fluid flow between various fluid passages formed in the body. At least one and preferably a plurality of discrete targets are carried on the spool. Detecting means is mounted in the valve body and has a detection field for detecting one target within the detection field as the spool shifts between positions.

In the preferred embodiment, the targets comprise a plurality of axially spaced, distinct target surfaces formed on the spool, each target surface having a distinct outer diameter. Preferably, each target surface is a light reflective surface. In this embodiment, the detecting means preferably comprises a light emitter which transmits a light beam in the detecting field toward the spool. The detecting means also includes a light detector to detect the light beam reflected off of a target surface. The detecting means generates an output signal whose magnitude is proportional to the amount of light reflected off of the target.

In one embodiment, the target comprises a plurality of increasing diameter annular sections extending in one axial direction on the spool. Preferably, the targets are carried on one end of the spool. An intermediate, non-target surface may be formed between two adjacent targets.

The output signal from the detecting means is input into a controller which compares the magnitude of the output signal with prestored values corresponding to the amount of light reflected off of a target surface in each distinct valve spool position. The controller is thus able to determine the exact position of the valve spool as the valve spool shifts between a plurality of distinct positions within the valve body.

The valve spool position detector apparatus of the present invention provides an effective way to determine the absolute position of a shiftable valve spool within a valve body. The detecting means is easily implemented on a standard valve spool. The valve spool position detector apparatus of the present invention also lends itself to advantageous use in many different types of valves and with different valve spool operators.

BRIEF DESCRIPTION OF THE DRAWINGS

The various features, advantages and other uses of the present invention will become more apparent by referring to the detailed description and drawing in which.

DESCRIPTION OF THE PREFERRED EMBODIMENT

Figure 1:
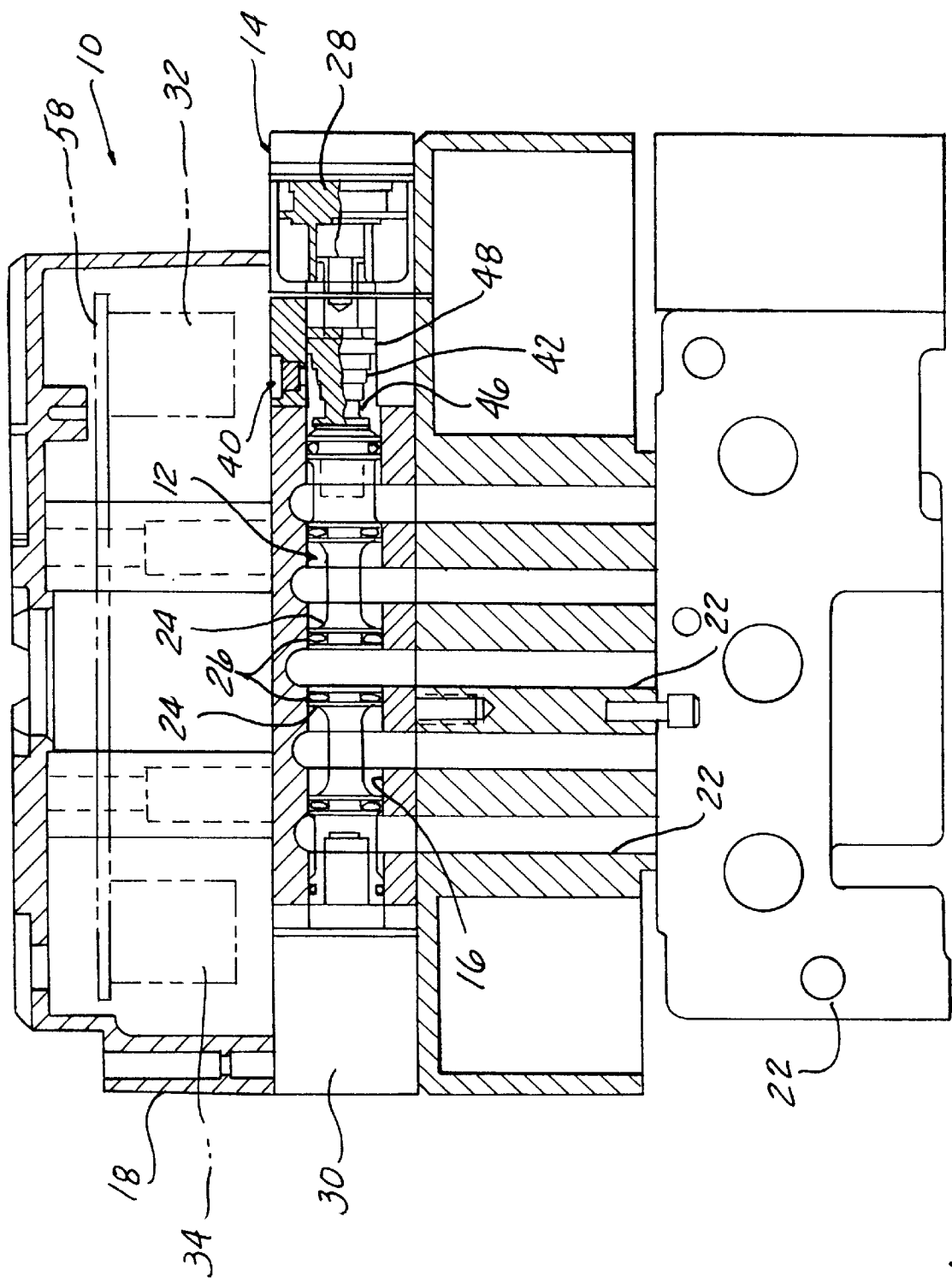
FIG. 1 is a cross-sectional view of a typical fluid valve incorporating a valve spool position detector apparatus constructed in accordance with the teachings of the present invention.
Figure 2:
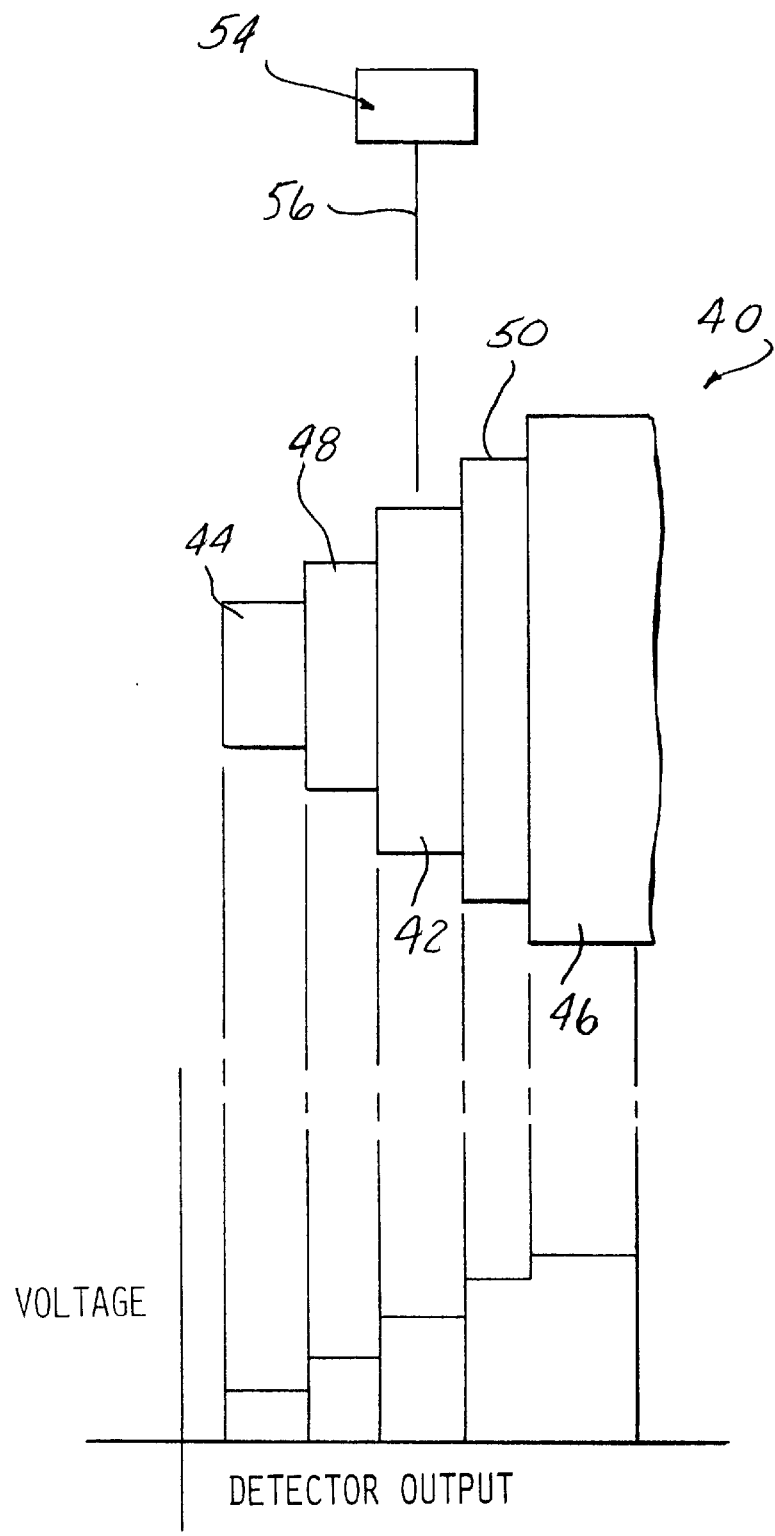
FIG. 2 is an enlarged view of the valve spool position detector apparatus of the present invention as shown in FIG. 1.
Figure 3:
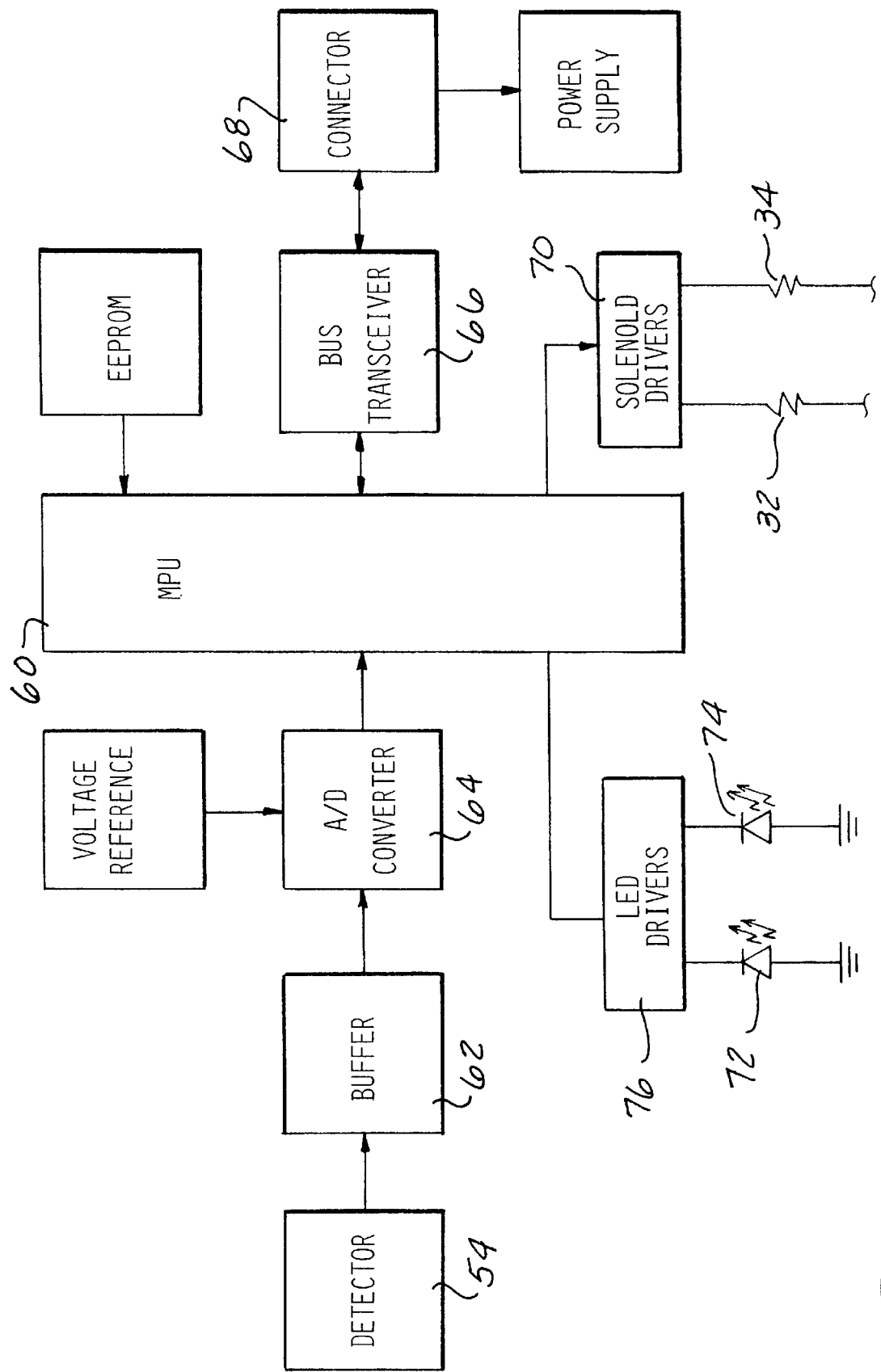
FIG. 3 is a block diagram of a controller used in the valve spool position detector apparatus of the present invention.

Referring to FIGS. 1–3, there is depicted a valve spool position detector apparatus constructed in accordance with the teachings of the present invention.

FIG. 1 specifically depicts an exemplary valve 10. By example only, the valve 10 is depicted as a blocked center, three-position valve with a spool 12 normally located in a center position and movable in either of two axial directions to a first position and a second position. The valve 10 includes a body 14 having an internal bore 16 in which the spool 12 is slidably disposed. A cover 18 is fixedly secured to the body 14 and houses control elements as described hereafter. Further, as shown in FIG. 1, the body 14 is fixedly mounted to a conventional fluid manifold 20 providing fluid flow paths to a source of pressurized fluid, and fluid-operated devices, such as pumps, piston cylinders, etc.

A plurality of fluid flow ports or bores, all denoted by reference number 22, are formed in the valve body 14 and extend from the internal bore 16 to fluid flow connection with corresponding bores in the manifold 20.

The spool 12 is conventionally formed with a plurality of radially enlarged, axially spaced, annular collars or portions all denoted by reference number 24. Seals 26, such as O-rings, are mounted in annular grooves generally formed on opposite sides of each radially enlarged portion 24. The seals 26 provide a sealed connection between the internal surfaces of the bore 16 in the valve body 14 and the spool 12.

One or more end operators or actuators 28 and 30 are mounted in the valve body 14 on opposite ends of the bore 16. The operators 28 and 30 may include any conventional valve operator, such as a solenoid, pilot valve, spring, etc. In the three position valve 10 shown in FIG. 1, two identical operators 28 and 30 are mounted on opposite ends of the bore 16. Separate solenoids 32 and 34 are mounted within the valve cover 18. The solenoids 32 and 34 are connected in a known manner to pilot valves forming the operators 28 and 30 to control the flow of pressurized fluid to the pilot valves 28 and 30 to effect extension and exhaust of the pilot valves 28 and 30 depending upon which solenoid 32 and 34 is actuated. Extension of the rod of one of the pilot valves 28 and 30 effects axial sliding movement of the spool 12 from the normal center position shown in FIG. 1 to one of a first or second positions depending upon which of the operators 28 and 30 is activated. On moving to either of the first or second positions, the seals 26 on the spool 12 open and/or block off selected ports 22 to change the direction of pressurized fluid flow through the valves 10.

As shown in FIG. 1, and in an enlarged detail view in FIG. 2, a unique valve spool position sensing or detecting apparatus 40 is mounted in the valve body 14. The valve spool position sensing apparatus 40, hereafter referred to as the spool position detector, includes a plurality of distinct, discrete targets which are carried or formed on the spool 12. In an exemplary embodiment, specifically designed for the three position valve shown in FIG. 1 and by way of example only, the plurality of targets comprise a first target 42, a second target 44, and a third target 46. The targets 42, 44 and 46 are carried on the spool 12 such as on an integral extension extending axially outward from one end of the spool 12 as shown in FIG. 1. Each of the targets 42, 44 and 46 is axially spaced from any adjacent target. Preferably, an intermediate non-target surface or area, such as non-target surfaces 48 and 50, are formed between the first and second target 42 and 44 and between the first target 42 and the third target 46.

In a preferred embodiment, the first, second and third target 42, 44 and 46 are in the form of different diameter annular collars or bands. By example only, the second target 44 has a first small diameter. The first target 42 has an outer diameter larger than the diameter of the second target 44. The third target 46 has an outer diameter larger than the diameter of the first target 42. Clearly, any different diameter may be provided for any of the targets 42, 44 and 46.

Preferably, the first, second and third targets 42, 44 and 46 comprise light reflective surfaces formed by the use of aluminum, various machining operations, etc.

The intermediate, non-target portions 48 and 50 have an axial length so as to dispose the second and third targets 44 and 46 in line with a detector when the valve spool 12 is shifted to the second or first positions from the normal center position.

The non-target portions 48 and 50 represent fault conditions representative of an incomplete or partial shift of the spool 12. A reflected light beam from target portions 48 or 50 may be used to initiate a fault warning or other corrective and/or evasive action.

The detecting means includes a detector 54 which, in one exemplary embodiment, comprises an infrared emitter and receiver. The detector 54 is fixedly mounted in the valve body 14 at a position spaced from the targets 42, 44 and 46 at one end of the valve spool 12. The detector 54 has a field of view or detection field denoted by reference number 56 and defined by the path of a light beam emitted from the detector 54.

In operation, the detector 54 emits an infrared light beam along the field of view 56. The light beam strikes and is reflected from one surface on the spool position detector 40 on the spool 12 to the receiver of the detector 54 which can be a phototransistor. The detector 54 generates an output signal whose magnitude is proportional to the amount of light reflected off of the target. The magnitude of the output of the detector 54 varies with each target as shown in FIG. 2.

Due to the varying diameters of the first, second and third targets 42, 44 and 46, different amounts of light will be reflected to the receiver of the detector 54 depending upon which of the targets 42, 44 and 46 is within the detection field 56 and struck by the light beam emitted by the detector 54. In this manner, an indication can be obtained as to which target 42, 44 or 46 is positioned within the field of view 56 of the detector 54.

A controller or control circuit is employed to analyze the output signals from the detector 54 and provide an indication of the position of the valve spool 12. The control or controller may be mounted externally from the valve 10. However, in an exemplary embodiment, the control is mounted on a printed circuit board 58 within the cover 18. The solenoids 32 and 34 may also be mounted on the printed circuit board 58. The control circuit, as shown in FIG. 3, includes a central processor 60. The central processor 60 may be any suitable microprocessor or other computer-based device executing a control program stored in memory either internal or external to the microprocessor 60. The controller receives the output from the detector 54 through a buffer 62 and an analog to digital (A/D) converter 64 which converts the analog output signal from the detector 54 to a digital value. This digital signal is then input to the central processor 60 which compares the digital signal with a number of prestored values consistent with the amount of light reflected from each of the distinct targets 42, 44 and 46. A range of magnitudes can be provided for the amount of light reflected by each of the targets 42, 44 and 46 to accommodate wear, position variations, dirt, etc., which may be encountered during the use of the valve 10.

Upon detecting a match between the output of the signal detector 54 with one of the prestored target position values, the central processor 60 outputs a signal through a bus transceiver, by example only, and a connector 68 to an external controller or bus. In this manner, the output signal may be employed by an external controller or circuit to either provide a simple indication that the valve spool is in one of several different positions or used to take appropriate action when the valve spool reaches one of the various positions.

Although the valve spool position detecting apparatus 40 of the present invention has been described as utilizing light reflecting targets and a combined infrared emitter/receiver 54, it will be understood that the present invention may also be implemented by other detector means. For example, a Hall effect detector may be mounted in the valve body 14 to detect variations in a magnetic field caused by distinct sized targets similar to the targets 42, 44 and 46 shown in FIGS. 1 and 2 as the valve spool 12 shifts between the various positions. Such a detector would output an analog signal whose magnitude corresponds to or is proportional to the intensity of the detected magnetic field. This analog value, after being digitized, is compared by the central processor 60 with various prestored values corresponding to a specific position of the valve spool 12. Further, although the targets may be defined by distinct diameter or radially extending portions carried on the valve spool 12, magnets of different magnetic field intensity may be mounted in an axially spaced manner along an extension on one end of the valve spool 12.

The central processor 60 also controls drivers 70 for the solenoids 32 and 34, which drivers 70 receive control signals from an external controller. Further, the central processor 60 controls indicators 72 and 74, such as LEDs, via control signals to LED drivers 76. The LEDs 72 and 74 can be used to indicate the spool 12 in the first or second positions, respectively.

The central processor 60 also executes a stored program to implement other features. For example, an internal timer having a programmable time period can be activated upon each valve shift to measure the valve shift time. The control program stores the actual elapsed valve shift time for the last shift to a particular valve spool position. In addition, the central processor 60 via the control program can generate an error signal when the actual valve shift time is greater than the preprogrammed shift time immediately upon each occurrence. In this manner, if the valve spool 12 does not shift within a programmed set time, the central processor 60 will send an error message to an external controller to enable evasive action to the taken.

In summary, the present valve position sensing apparatus determines the position of a valve spool by unique means which can be easily implemented in existing valves.

What is claimed is:

1. A fluid valve comprising:
   a valve body;
   a spool disposed in the body and axially movable between at least two positions for switching fluid flow through the valve body;
   at least two distinct targets carried on the spool, each target corresponding to one of the at least two positions of the spool; and
   means, mounted in the body and having a detection field, for detecting a distinct measurable characteristic of each target within the detection field as the spool shifts between the at least two positions.

2. The fluid valve of claim 1 wherein the detecting means comprises:
   a light emitter emitting a light beam in the detection field; and
   a light detector generating an output signal whose magnitude is proportional to the amount of light reflected off of the spool positioned within the detection field of the light beam.

3. The fluid valve of claim 2 further comprising:
   control means, responsive to the output signal, for generating an indication of the position of the spool.

4. The fluid valve of claim 3 further comprising:
   means for storing a target value corresponding to the measurable characteristic of each of the at least two targets in the detection field;
   the control means including means for comparing the target value with an output of the detecting means and generating an output upon detecting a match therebetween.

5. The fluid valve of claim 1 wherein:
   the at least two targets are carried on one axial end of the spool.

6. A fluid valve comprising:
   a valve body;
   a spool disposed in the body and axially moveable between at least two positions for switching fluid flow through the valve body;
   a plurality of axially spaced, distinct target surfaces carried on the spool, each target surface having a distinct outer diameter; and
   means mounted in the body and having a detection field, for detecting each target surface within the detection field as the spool shifts between the two positions.

7. The fluid valve of claim 6 wherein:
   the target surfaces forming each of the plurality of targets are light-reflective surfaces.

8. The fluid valve of claim 6 further comprising:
   a plurality of intermediate, non-target surfaces formed between two axially spaced target surfaces.

9. The fluid valve of claim 6 wherein:
   each of the plurality of surfaces forming each target increases in diameter from one axial end of the spool.

10. The fluid valve of claim 6 wherein the detecting means comprises:
    a light emitter emitting a light beam in the detection field; and
    a light detector generating an output signal whose magnitude is proportional to the amount of light reflected off of the spool positioned within the detection field.

11. The fluid valve of claim 10 further comprising:
    control means, responsive to the output signal from the detecting means, for generating an indication of the position of the spool.

12. The fluid valve of claim 11 further comprising:
    means for storing a target value corresponding to each target in the detection field;
    the control means including means for comparing the target value with an output of the detecting means and generating an output upon detecting a match therebetween.

13. The fluid valve of claim 1 wherein the measured characteristic is different external dimensions for each target.

14. The fluid valve of claim 1 wherein the measured characteristic is a distinct outer diameter for each target.

15. In an apparatus having a first member axially moveable between first and second positions relative to a stationary second member, the improvement comprising:
    a plurality of axially spaced, distinct targets carried on the first member, each target corresponding to one of the at least first and second positions of the first member; and
    means, carried on the second member and having a detection field, for detecting a distinct measurable characteristic of each target within the detection field as the first member shifts between the at least first and second positions.

16. The improvement of claim 15 wherein the measured characteristic comprises:
    each target having a different exterior dimension.

17. The improvement of claim 15 wherein the measured characteristic comprises:
    each target having a distinct outer diameter.

18. The improvement of claim 15 wherein the measured characteristic comprises:

each target formed of a light reflective surface reflecting different amounts of light therefrom.

19. The improvement of claim 15 wherein the detecting means comprises:

a light emitter emitting a light beam in the detection field; and a light detector generating an output signal whose magnitude is proportional to the amount of light reflected off of one of the plurality of targets positioned within the detection field.

20. The improvement of claim 15 further comprising:

control means for storing a target value corresponding to a measured characteristic of each of the plurality of targets in the detection field;

the control means including means for comparing the target value with an output of the detecting means and generating an indication upon detecting a match therebetween corresponding to one position of the first member.

* * * * *